No. 872,755.
PATENTED DEC. 3, 1907.
M. RUTHENBURG.
CEMENTATION PROCESS.
APPLICATION FILED JAN. 17, 1906.
2 SHEETS—SHEET 1.
FIG. I.
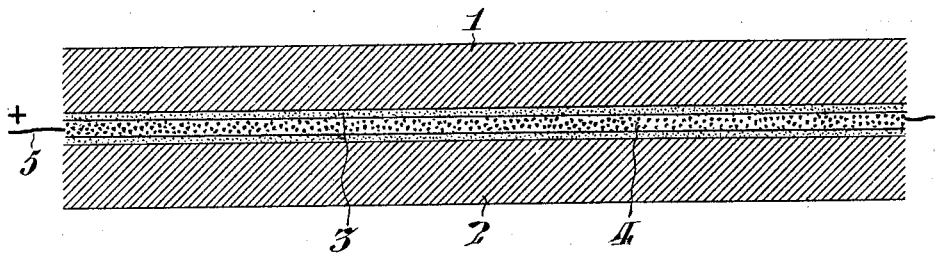
FIG. II.
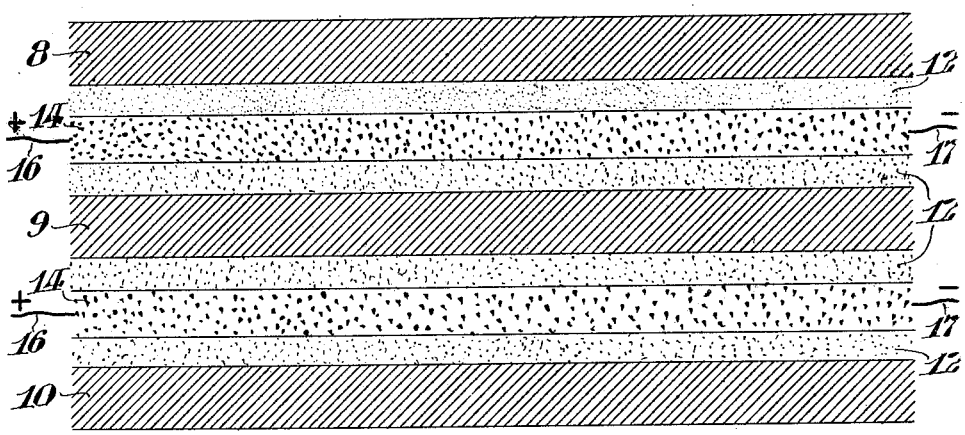
FIG. III.
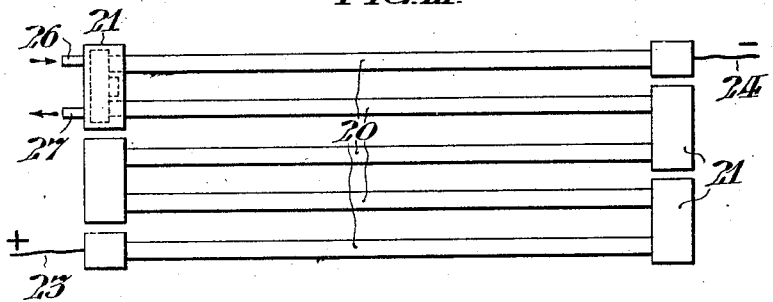
WITNESSES:
Clifton C. Hallowell
John E. Bergner
INVENTOR:
MARCUS RUTHENBURG,
By Paige, Paul & Foley
Attys.

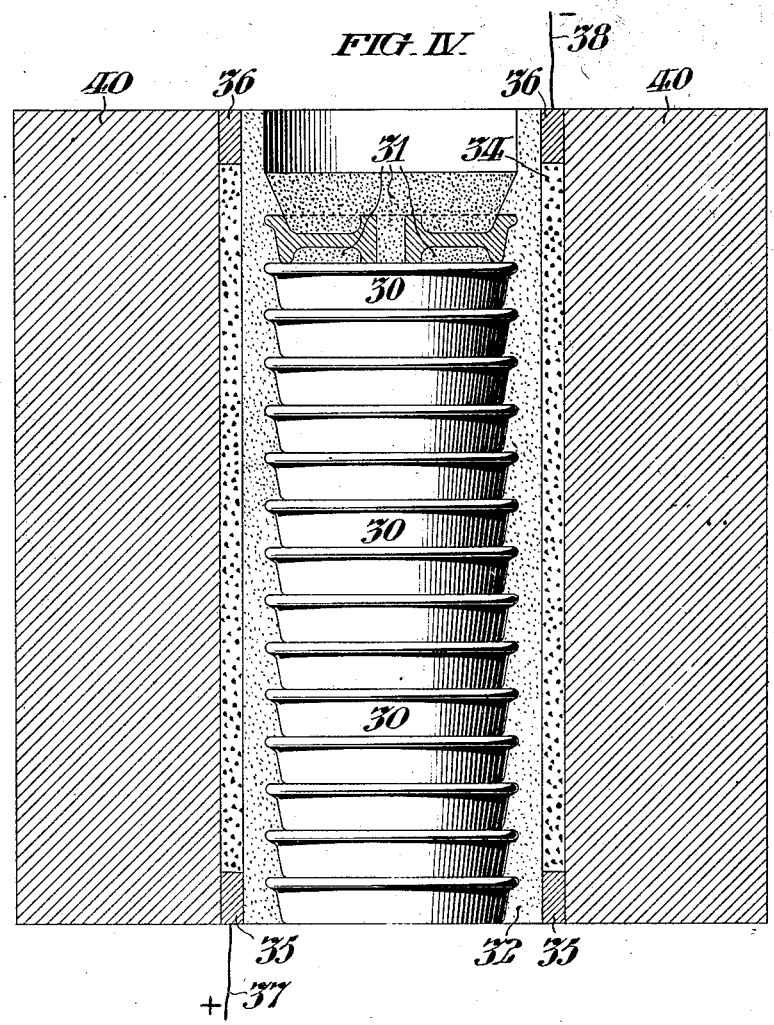

UNITED STATES PATENT OFFICE.

MARCUS RUTHENBURG, OF LOCKPORT, NEW YORK.

CEMENTATION PROCESS.

No. 872,755.　　　　Specification of Letters Patent.　　　　Patented Dec. 3, 1907.

Application filed January 17, 1906. Serial No. 296,452.

*To all whom it may concern:*

Be it known that I, MARCUS RUTHENBURG, of Lockport, in the county of Niagara and State of New York, have invented certain new and useful Improvements in Cementation Processes, whereof the following is a specification, reference being had to the accompanying drawings.

My improvements relate to the application of an electric current to effect the carburization of cast steel or wrought iron or steel.

As hereinafter described, the carburizing material, for instance comminuted charcoal, is heated in contact with the metal to be carburized, by limiting the electric current to a path parallel with the face of the metal to be carburized, by a poor conductor either comprised in the carburizing material or embedded in insulating material, for instance sand, which will transmit heat to the carburizing material.

I am aware that it has been proposed to carburize an iron or steel plate by an electric current, passing through that face of the plate which is to be carburized, and forming an arc adjacent thereto. Therefore, it may be observed that it is characteristic of the present invention that the carburization is effected by an electric current which is excluded from the metal to be carburized.

My improved process is advantageous in that not only the electric current but the heat thereby generated are localized in the region where required, and the temperature may be maintained substantially uniform throughout any desired area.

In the accompanying drawings, Figure I, shows the application of my invention in its simple form to carburize two steel armor plates. Fig. II, shows the application of my invention in a more complex form to carburize three steel armor plates. Fig. III, is a diagram showing a convenient arrangement of the carbon resister. Fig. IV, shows the application of my invention to a series of car wheels.

Referring to Fig. I; the steel plates 1, and 2, have layers of carburizing material 3, for instance, comminuted charcoal, in contact with their surfaces which are to be carburized, and a distinct layer 4, comprising a poor conductor or resister material, extends between said layers 3, and is connected by the leads 5, and 6, with the opposite poles of a source of current, so that said layers 3, are raised to the proper temperature to effect the carburization of the contiguous surfaces of said plates by heat transmitted from said layer 4.

Referring to Fig. II; the steel plates 8, 9, and 10, have layers of carburizing material 12, in contact with their surfaces which are to be carburized, and distinct layers of resister material 14, extend between said layers 12, and are connected by the leads 16, and 17, with the opposite poles of a source of current, so that the layers 14, are heated and transmit the required heat to the layers 12.

Although I have indicated the resister material 14, as of granular form, it is to be understood that it may comprise rods or bars of suitable material, for instance, carbon, so connected as to form a continuous path for the current. Such an arrangement is shown in Fig. III, wherein the carbon rods 20, are alternately connected in pairs at their opposite ends, conveniently by bronze metal couplings 21, and, the terminal bars are connected by the leads 23, and 24, with the opposite poles of a source of current. Said couplings 21, may be hollow to receive a cooling medium directed therethrough by pipes 26, and 27.

It is to be understood that the continuous path of resister material shown in Fig. III, may be directly embedded in a layer of carburizing material or may be embedded in a layer of insulating material, for instance, sand, capable of distributing heat uniformly to the carburizing material.

Referring to Fig. IV, a series of cast steel car wheels 30, are stacked one upon another and the interstices between them packed with iron oxid 31. It being desired to carburize only the tires or rims of said wheels, the latter are surrounded by carburizing material 32, for instance, comminuted charcoal, and said material is backed by a layer 34, comprising a resister connecting at its opposite ends with the annular conductors 35, and 36, which are respectively connected by the leads 37, and 38, with the opposite poles of a source of current. I find it convenient to assemble the wheels 30, as described, in a soaking pit, comprising the walls 40, shown in Fig. IV.

It is to be understood that the layer 34, shown in Fig. IV, may comprise a series of connected carbon rods, embedded in comminuted graphite, sand or other material which will transmit heat to the layer of carburizing material 32.

It is to be understood that although I have mentioned charcoal as a carburizing material, other material may be employed, for instance, barium carbonate which is also a poor conductor of electricity.

It is to be understood that I do not desire to limit myself to the particular construction or arrangement above described, as it is obvious that various modifications may be made therein without departing from the essential features of my process.

I claim:—

1. The process of carburizing steel or iron, which consists in heating the carburizing material in contact with the metal to be carburized, by an electric current limited to a path extending parallel with the face of the metal to be carburized and excluded from the latter, substantially as set forth.

2. The process of carburizing steel or iron, which consists in heating the carburizing material in contact with the metal to be carburized, by an electric current limited to a continuous path through a poor conductor and excluded from the metal to be carburized, substantially as set forth.

3. The process of carburizing steel or iron, which consists in heating the carburizing material in contact with the metal to be carburized, by an electric current limited to a path through the carburizing material, and excluded from the metal to be carburized, substantially as set forth.

4. The process of carburizing steel or iron, which consists in heating the carburizing material in contact with the metal to be carburized, by an electric current limited to a continuous path through a poor conductor extending parallel with the face of the metal to be carburized and excluded from the latter, substantially as set forth.

5. The process of carburizing steel or iron, which consists in heating the carburizing material in contact with the metal to be carburized, by an electric current limited to a continuous path through a poor conductor extending parallel with the face of the metal to be carburized, and maintaining said poor conductor insulated from the carburizing material, substantially as set forth.

6. The process of carburizing steel or iron, which consists in heating the carburizing material in operative relation with the metal to be carburized, by the action of an electric current excluded from said metal in a continuous path formed by a poor conductor, substantially as set forth.

7. The process of carburizing steel or iron, which consists in heating the carburizing material in operative relation with the metal to be carburized, by an electric current in a path formed by a poor conductor, while maintaining electrical insulating heat transmitting material between said poor conductor and said carburizing material, substantially as set forth.

8. The process of hardening steel or iron, which consists in maintaining carburizing material in contact with said metal; backing said material with a layer of resister; and, maintaining the carburizing material at the proper temperature by including said resister in an electric circuit, substantially as set forth.

9. The process of hardening the rims of steel car wheels, which consists in surrounding the rims of a series of said wheels with a carburizing material; backing said material with a layer of resister; and, maintaining the carburizing material at the proper temperature by including said resister in an electric circuit, substantially as set forth.

In testimony whereof, I have hereunto signed my name at Lockport in the county of Niagara and State of New York, this 15th day of January, 1906.

MARCUS RUTHENBURG.

Witnesses:
PAUL P. PLASTER,
MARK J. TOVELL.